United States Patent [19]

Nishimura et al.

[11] Patent Number: 4,628,521
[45] Date of Patent: Dec. 9, 1986

[54] INDICATING DEVICE IN MEASURING MACHINE

[75] Inventors: Takeji Nishimura; Mamoru Yasuda, both of Kawasaki, Japan

[73] Assignee: Mitutoyo Mfg. Co., Ltd., Tokyo, Japan

[21] Appl. No.: 625,880

[22] Filed: Jun. 28, 1984

[30] Foreign Application Priority Data

Jul. 14, 1983 [JP] Japan ................................ 58-128530

[51] Int. Cl.$^4$ .......................... G01D 7/00; G06M 3/12
[52] U.S. Cl. ......................................... 377/24; 377/30; 377/45; 307/247 A
[58] Field of Search ....................... 377/24, 30, 31, 20, 377/45; 307/247 A

[56] References Cited

U.S. PATENT DOCUMENTS

| 3,471,852 | 10/1969 | Floyd | 377/30 |
| 3,982,107 | 9/1976 | Butler | 377/24 |
| 4,266,215 | 5/1981 | Adams | 377/30 |
| 4,476,567 | 10/1984 | Johnson | 377/24 |
| 4,528,682 | 7/1985 | Nakaoki | 377/24 |
| 4,532,643 | 7/1985 | Thompson | 377/31 |

Primary Examiner—John S. Heyman
Attorney, Agent, or Firm—Flynn, Thiel, Boutell & Tanis

[57] ABSTRACT

An indicating device in a measuring machine in which the flickering of an indicated value due to vibrations of the machine and the like is avoided. The indicating device includes a flickering sensing circuit for receiving up signals or down signals outputted from an encoder as input signals thereto and sensing the change in the signals from the up signals to the down signals and vice versa. When the change in the signals is sensed by this flickering sensing circuit, a hold signal having a predetermined period of time is outputted from a hold circuit, whereby renewing storage of counted values from the counter by a latch circuit is interrupted for a predetermined period of time.

1 Claim, 4 Drawing Figures

INDICATING DEVICE IN MEASURING MACHINE

BACKGROUND OF THE INVENTION

1. Field of the Invention

This invention relates to an indicating device in a measuring machine, and more particularly to an indicating device in which the flickering of an indicated value due to vibrations and the like is prevented.

2. Description of the Prior Art

A digital indicating device for digitally indicating a measured value free from personal errors in reading and permitting quick reading, has been widely utilized in various fields of industry.

In general, the digital indicating device of the type described is constructed such that output signals from an encoder operationally associated with a measuring machine are computed, operated and digitally indicated as a measured length in an indication unit formed of liquid crystal and the like.

As the fields of utilization of the measuring machine have widened to the application of feedback signals in a machine tool and higher accuracy has been demanded in the measurement of length, the flickering of the indicated value has become problematical.

For example, as shown in FIG. 1, in a so-called photoelectric linear type measuring machine wherein a main scale 1 and an index scale 3 provided on a slider 2 are moved relative to each other, a change in light quantity due to this relative movement is detected as an electric signal by a detection head 4 and converted into pulse signals, and a measured length is obtained from the pulse signals. Clearance fluctuations between both scales seriously affect the measuring accuracy. In view of this, in order to reduce the lowering in accuracy due to the clearance fluctuations, it is necessary to pressingly retain the interval between both scales through sliding elements 5 and the like for example. However, if the pressing force is excessive, then, when the direction of relative movement is reversed, a return error is increased due to a deflection of a slider support arm 6. In the present status, the fact is that improvements are being made in the method of reducing the adverse influence of the clearance fluctuations, while, the sliding resistance of the slider is being decreased so as to make the return error very small.

In consequence, when the measuring machine is mounted on a machine tool or the like in particular, the indicated value flickers due to the vibrations from the machine tool and it is difficult to read the indicated value. Furthermore, in the indicator of a seven segment system, even if a detected value fluctuates by ±1 μm, there are some cases where the indicated value cannot be read at all. For example, when the detected value fluctuates between 99,995 mm and 100,000 mm, there are cases where it is actually read as 188,888. Moreover, the better the sensibility of the measuring machine, the more notably the above-described error appears.

To obviate this disadvantage, there has been known a method in which a renewing interval of samplings of indication data is enlarged as a general technique in the digital indication field. However, this method is not suitable for the measuring machine. The reason is that if tasks of positioning a bite at a predetermined position or the like occur during a measuring process for example, the period of time for confirmation is lengthened to thereby cause troubles.

SUMMARY OF THE INVENTION

Here, the present invention has as its object the provision of an indicating device in a measuring machine wherein the flickering due to vibrations and the like is prevented and quick and easy reading can be conducted.

In general, many of the measuring machines are constructed such that up signals or down signals are emitted in accordance with moving directions of movable members. According to the present invention, on the basis of the above point, a reversal between the both signals, i.e. a change from up signals to down signals or from down signals to up signals is sensed, whereby an indicated value is held until a predetermined period of time elapses.

To the above end, more specifically, in an indicating device in a measuring machine, wherein there is provided a counter capable of conducting adding and subtracting calculations in accordance with up signals or down signals outputted from an encoder in operational association with the direction of relative movement between relatively movable members relating to the measurement of length such for example as a main scale and an index scale and a relative movement value between the relatively movable members is digitally indicated in an indicator on the basis of a counted number of the counter, the indicating device includes: a flickering sensing circuit for receiving the up signals or the down signals from the encoder as input signals and sensing the change of the input signals from the up signals to the down signals and vice versa; a hold circuit for outputting a hold signal of a predetermined period of time when the change in the signals is sensed by the flickering sensing circuit; and a latch circuit for successively, renewingly storing the counted value from the counter and causing the indicator to indicate the same, while, interrupting renewing storage of the counted value during the period of time of receiving the hold signal from the hold circuit.

DETAILED DESCRIPTION OF THE PREFERRED EMBODIMENT

Description will hereunder be given of one embodiment of the present invention with reference being made to the drawings.

Figure 1:
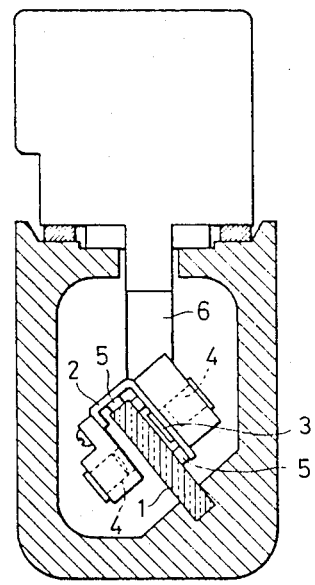
FIG. 1 is a sectional view showing the mechanism of a conventional measuring machine.
Figure 2:
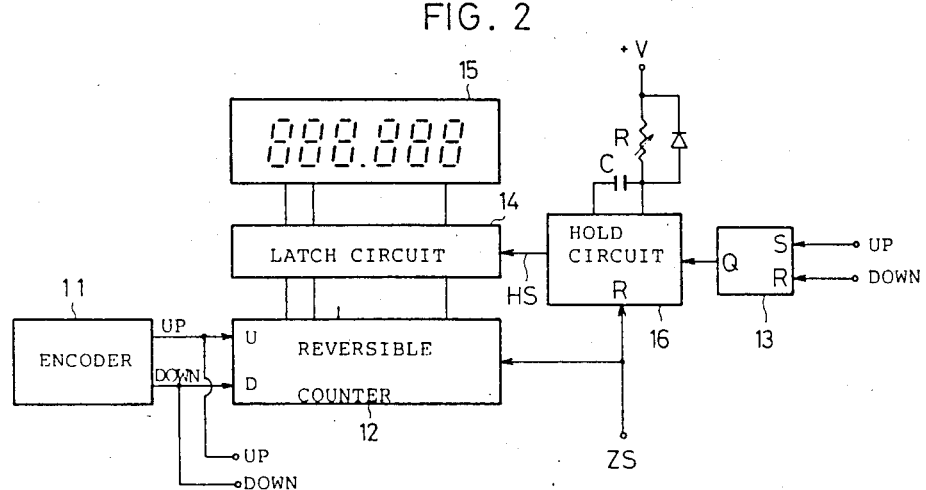
FIG. 2 is a block diagram showing an embodiment of the indicating device according to the present invention.

FIG. 2 shows a circuit arrangement of the indicator of this embodiment. In the drawing, an encoder 11 shapes into rectangular wave signals outputted from a detection head 4 when relatively moving members of the measuring machine such for example as the main scale 1 and the index scale 3 in the linear type measuring machine shown in FIG. 1 move relative to each other, further, converts the rectangular wave signals into pulse signals corresponding to a relative movement value between the both scales, and thereafter, outputs both of these pulse signals as the up signals UP and the down signals DOWN in accordance with the direction of relative movement. Both signals UP and DOWN are inputted into a reversible counter 12. A flipflop circuit 13 is utilized as a flickering sensing circuit.

The reversible counter 12 conducts an adding calculation when an up signal UP is inputted from the encoder 11, and conducts a subtracting calculation when a down signal DOWN is inputted from the encoder 11. Then a counted value (a relative movement value between both scales) in the reversible counter 12 is successively, renewingly stored in a latch circuit 14, thereafter, digitally indicated in an indication unit 15, and thence is cleared to zero in response to a zero set signal ZS based on the operation of a zero set button, not shown, on the measuring machine. In addition, the digital indicator 15 is formed by an indication unit of six places, each of which is composed of seven segments.

On the other hand, an up signal UP outputted from the encoder 11 is inputted to a set input terminal S of flipflop 13 and a down signal DOWN outputted from the encoder 11 is inputted to a reset input terminal R of the flipflop 13, respectively. Furthermore, connected to an output terminal Q of the flipflop 13 is a hold circuit 16. When an output signal rises from the output terminal Q of the flipflop 13, the hold circuit 16 delivers to the latch circuit 14 a hold signal HS having a predetermined period of time T determined by a time constant of a capacitor C and a variable resistance R, whereby, in the latch circuit 14, the renewingly storing operation of the counted value is interrupted while the hold signal HS is on. In addition, the hold signal HS outputted from the hold circuit 16 is released by the zero set signal ZS.

Description will hereunder be given of the operation of this embodiment. During the measuring operation, when the main scale 1 and the index scale 3 are moved relative to each other, in accordance with the direction of relative movement of both scales, the encoder 11 successively delivers an up signal UP or a down signal DOWN to the reversible counter 12 and the flipflop 13. Then, the reversible counter 12 conducts an adding or a subtracting calculation in accordance with the up signal UP or the down signal DOWN to count the relative movement value between both scales. This counted value is successively, renewingly stored in the latch circuit 14, and then, digitally indicated in the digital indicator 15. In consequence, if an indicated value in the digital indicator 15 is read, then a relative movement value between both scales, i.e. a measured length value can be obtained.

Figure 3:
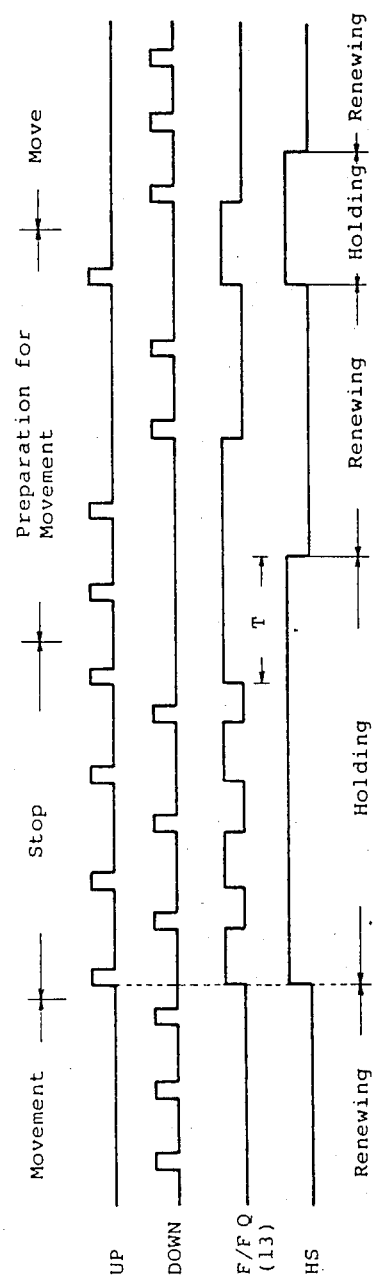
FIGS. 3 and 4 are time charts, respectively.

Now, as shown in FIG. 3, when both scales are moved relative to each other in a direction where only the down signal DOWN is outputted from the encoder 11, and then stopped at desired positions, the encoder 11 usually outputs an up signal UP and a down signal DOWN alternately every other pulse for example due to external vibrations. This causes an output signal from the output terminal Q of the flipflop 13 to be held at the L level in the condition where only the down signal DOWN is inputted, however, when the up signal UP is delivered, the output signal is inverted to the H level and maintained at the H level until the next down signal DOWN is inputted. Here, each time the output signal from the flipflop 13 rises from the L level to the H level, the hold circuit 16 delivers the hold signal HS having the predetermined period of time T to the latch circuit 14 to interrupt the renewaling storage of the counted values in the latch circuit 14, whereby, while the hold signal is being delivered to the latch circuit 14, the indicated value in the digital indicator 15 is held as it is. In this case, if the period of time T of the hold signal HS is set above a period of the up signal UP caused by the vibrations for example, then, while the up signal UP and the down signal DOWN are alternately repeated every other pulse due to the vibrations at the time of stop, the hold signal HS is continuously outputted, whereby the indicated value in the indicator 15 is continuously held at the value obtained when both scales are stopped. In consequence, the flickering due to the vibrations at the time of stop is avoidable and the value obtained when both scales are stopped can be quickly and easily read. Thereafter, if both scales 1 and 3 are moved relative to each other again, then the hold signal HS is released, whereby the counted value of the reversible counter 12 can be successively indicated in the indicator 15. In addition, even while the indicated value is held, the reversible counter 12 is constantly counting, so that there is no error in the measured length due to the holding.

Figure 4:
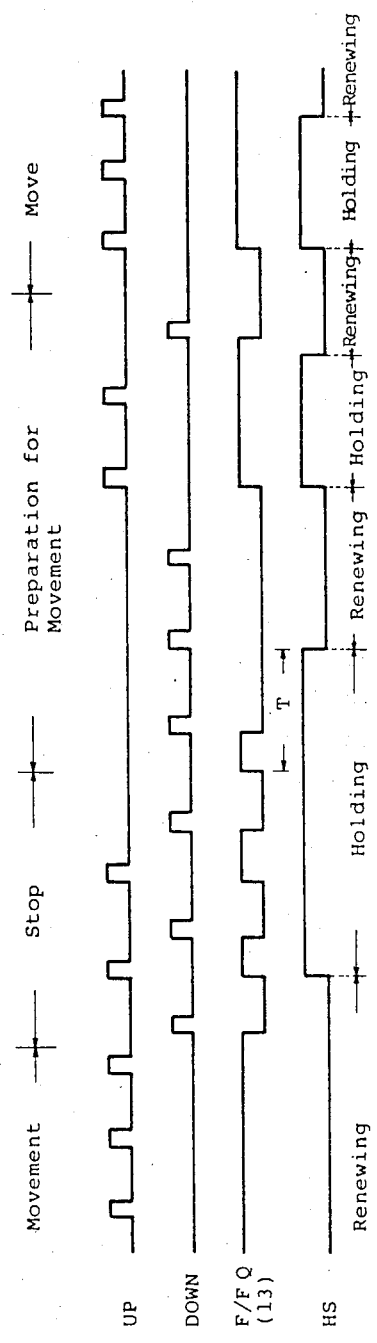

On the other hand, as shown in FIG. 4, when both scales 1 and 3 are moved relative to each other in a direction where only the up signal UP is outputted from the encoder 11, and stopped at desired positions, then, the indicated value is held in the same manner as above. However, in this case, the down signal DOWN is outputted in the condition where both scales 1 and 3 are stopped, and thereafter, from the time when the up signal UP is outputted, the hold signal HS is outputted, whereby there occurs an error of one pulse as compared with the case of the direction of relative movement shown in FIG. 3. However, the error of this extent will do no harm to the actual measurement of length.

In consequence, according to this embodiment, the flipflop 13 senses the change of the input signals thereto from the up signal UP to the down signal DOWN or from the down signal DOWN to the up signal UP, both of which are outputted from the encoder 11. When the flipflop 13 senses the change in the signals, i.e. the output signal from the flipflop 13 rises, the hold circuit 16 delivers the hold signal HS having the predetermined period of time T to the latch circuit 14, whereby the indicated value in the indicator 15 is held, so that the flickering of the indicated value due to the vibrations at the time of stop can be avoided and the measured length value can be quickly and accurately read.

Moreover, the period of time T of the hold signal HS is made adjustable, so that the optimum flickering preventive process can be conducted in accordance with the natural frequency of the machine. Further, in FIGS. 3 and 4, description has been given of the case where the up signal UP and the down signal DOWN are alternately outputted every other pulse due to the vibrations, however, in the case of a vibration system in which the up signal UP and the down signal DOWN are alternately outputted every several pulses, the period of time T of the hold signal HS may be set at a value larger than period of time from the first output of the up signal through the output of the down signal DOWN to the second output of the up signal UP.

Furthermore, even during the period of holding, the up signals UP and the down signals DOWN are constantly counted in the reversible counter 12, whereby, if the length measuring signal is conducted again, no measuring error occurs.

In addition to the above, the direction of relative movement between both scales 1 and 3 can be processed by a signal circuit and the circuit can be simply arranged, so that the circuit can be incorporated in the measuring machine.

Additionally, in working, the indicating device may be integral with or separate from the measuring machine. Furthermore, the measuring machine need not necessarily be limited to the photoelectric linear type measuring machine as illustrated in FIG. 1. In short, any indicating device in a measuring machine will do irrespective of type or sort, only if it outputs the up signal and the down signal in accordance with the direction of relative movement (including rotation) of the relatively movable members relating to the measurement of length.

As has been described hereinabove, the present invention can provide an indicating device in a measuring machine in which the flickering due to vibrations and the like is avoidable and the indicated value can be quickly and easily read.

What is claimed is:

1. An indicating device in a measuring machine having a counter capable of conducting adding and subtracting calculations in accordance with up signals and down signals from an encoder operationally associated with relatively movable members relating to the measurement of length, a relative movement value between said relatively movable members being digitally indicated in an indicator on the basis of a counted value of said counter, said indicator being defined by an indicating unit having several digit displays comprised of seven segments, the improvement comprising wherein said indicating device includes:

a flipflop circuit means for receiving up signals and down signals from said encoder as input signals and sensing the change of said input signals from up signals to down signals and vice versa to produce an output signal;

a hold circuit means responsive to said output circuit for outputting a hold signal of a predetermined period of time when said change in said input signals is sensed by said flipflop circuit means, said period of time being variably determined by a time constant circuit means which includes a capacitor and a variable resistance; and a latch circuit means for successively, renewingly storing the counted value from said counter and causing said indicator to indicate same, and for interrupting said renewingly storing of said counted values in response to a receiving of said hold signal from said hold circuit and latching said indicator to the last counted value, said last counted value being indicated for the duration of said period of time unless shortened by a disappearance of said hold signal.

* * * * *